(12) United States Patent
Yokoi

(10) Patent No.: US 8,803,026 B2
(45) Date of Patent: Aug. 12, 2014

(54) LASER MACHINING DEVICE AND BELLOWS DEVICE

(75) Inventor: Shigeru Yokoi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/514,357

(22) PCT Filed: Oct. 14, 2011

(86) PCT No.: PCT/JP2011/073670
§ 371 (c)(1),
(2), (4) Date: Jun. 7, 2012

(87) PCT Pub. No.: WO2012/050191
PCT Pub. Date: Apr. 19, 2012

(65) Prior Publication Data
US 2012/0241423 A1    Sep. 27, 2012

(30) Foreign Application Priority Data
Oct. 15, 2010  (JP) .................................. 2010-232565

(51) Int. Cl.
*B23K 26/04*    (2014.01)
*B23K 26/00*    (2014.01)

(52) U.S. Cl.
USPC .............. 219/121.62; 219/121.6; 219/121.61; 219/121.74; 219/121.78; 219/121.79; 219/121.83; 257/E21.347; 257/E21.599

(58) Field of Classification Search
CPC .... B23K 26/00; B23K 26/0853; B23K 26/08; B23K 26/0869; B23K 26/426; B23K 37/0235
USPC .............. 219/121.6–121.62, 121.74, 121.78, 219/121.79, 121.83; 257/E21.347; 257/E21.599; 438/463; 372/6
See application file for complete search history.

(56) References Cited

U.S. PATENT DOCUMENTS 3,643,299 A * 2/1972 Brown ............................ 445/34
4,044,363 A * 8/1977 Morgan ........................ 396/553
(Continued)

FOREIGN PATENT DOCUMENTS

EP    1 623 790 A1    2/2006
JP    58-158464 U    10/1983
(Continued)

OTHER PUBLICATIONS

Chinese Office Action for Chinese Patent Application No. 201180004855.6 mailed Dec. 4, 2013.
(Continued)

*Primary Examiner* — Dana Ross
*Assistant Examiner* — Brett Spurlock
(74) *Attorney, Agent, or Firm* — Sughrue Mion, PLLC

(57) ABSTRACT

Provided are: a table on which a workpiece is placed, a laser oscillator emitting a laser beam; a light-guide optical system deflecting the beam emitted from the oscillator; a cylindrical extensible bellows surrounding an optical path of the beam after the light-guide optical system deflects the beam; a bend mirror moving in an axial direction of the bellows while extending/contracting the bellows and deflecting the beam having passed through the bellows toward the table; a machining head irradiating the workpiece with the beam deflected by the mirror; an abnormality detector including a beam-sensor light-emitting unit emitting a beam advancing parallel with an axis of the bellows and a beam-sensor light-receiving unit measuring the amount of received light of the beam; and a control device bringing down the laser oscillator when the amount of received light of the beam in the beam-sensor light-receiving unit falls below a first threshold.

10 Claims, 8 Drawing Sheets

(56) References Cited

U.S. PATENT DOCUMENTS

| | | | |
|---|---|---|---|
| 4,278,352 A * | 7/1981 | Keller | 356/498 |
| 5,038,488 A | 8/1991 | Abramowsky et al. | |
| 5,925,268 A * | 7/1999 | Britnell | 219/121.63 |
| 5,938,954 A * | 8/1999 | Onuma et al. | 219/121.84 |
| 6,717,104 B2 * | 4/2004 | Thompson et al. | 219/121.73 |
| 6,820,489 B2 * | 11/2004 | Fernald et al. | 73/705 |
| 6,894,248 B2 * | 5/2005 | Arakawa et al. | 219/121.67 |
| 7,161,114 B2 * | 1/2007 | Zeygerman | 219/121.82 |
| 7,312,418 B2 * | 12/2007 | Tanabe et al. | 219/121.65 |
| 7,436,564 B2 * | 10/2008 | Gomi et al. | 359/213.1 |
| 7,557,976 B2 * | 7/2009 | Gomi et al. | 359/213.1 |
| 7,605,342 B2 | 10/2009 | Lambert et al. | |
| 7,710,625 B2 * | 5/2010 | Gomi et al. | 359/213.1 |
| 7,719,739 B2 * | 5/2010 | Gomi et al. | 359/213.1 |
| 7,871,903 B2 * | 1/2011 | Couch et al. | 438/463 |
| 7,888,620 B2 * | 2/2011 | Holmgren et al. | 219/121.6 |
| 8,197,066 B2 * | 6/2012 | Nagashima et al. | 353/20 |
| 2004/0129083 A1 * | 7/2004 | Fernald et al. | 73/705 |
| 2004/0178181 A1 * | 9/2004 | Leibinger et al. | 219/121.78 |
| 2004/0182839 A1 * | 9/2004 | Denney et al. | 219/121.78 |
| 2004/0182841 A1 * | 9/2004 | Denney et al. | 219/121.78 |
| 2004/0245227 A1 * | 12/2004 | Grafton-Reed et al. | 219/121.83 |
| 2005/0061778 A1 | 3/2005 | Arakawa et al. | |
| 2005/0127136 A1 * | 6/2005 | Haraguchi | 228/103 |
| 2005/0247683 A1 * | 11/2005 | Agarwal et al. | 219/121.73 |
| 2006/0027537 A1 | 2/2006 | Lambert et al. | |
| 2007/0081206 A1 * | 4/2007 | Tsukagoshi et al. | 359/2 |
| 2008/0068678 A1 * | 3/2008 | Suzuki et al. | 358/481 |
| 2008/0246973 A1 * | 10/2008 | Regaard | 356/615 |
| 2009/0001062 A1 * | 1/2009 | Zeygerman et al. | 219/121.78 |
| 2009/0120917 A1 * | 5/2009 | Koch et al. | 219/121.78 |
| 2009/0245318 A1 * | 10/2009 | Clifford, Jr. | 372/107 |
| 2009/0266802 A1 * | 10/2009 | Sawabe et al. | 219/121.67 |
| 2010/0059490 A1 * | 3/2010 | Unrath et al. | 219/121.73 |
| 2010/0089881 A1 * | 4/2010 | Bruland et al. | 219/121.68 |
| 2010/0140239 A1 * | 6/2010 | Couch et al. | 219/121.72 |
| 2010/0301023 A1 * | 12/2010 | Unrath et al. | 219/121.67 |

FOREIGN PATENT DOCUMENTS

| | | |
|---|---|---|
| JP | 64-5690 A | 1/1989 |
| JP | 9-220691 A | 8/1997 |
| JP | 10-6053 A | 1/1998 |
| JP | 2003-126977 A | 5/2003 |
| JP | 2010-274302 A | 12/2010 |
| WO | 2004/103633 A1 | 12/2004 |

OTHER PUBLICATIONS

European Office Action for European Application No. EP 11 83 2621 mailed May 9, 2014.

* cited by examiner

LASER MACHINING DEVICE AND BELLOWS DEVICE

CROSS REFERENCE TO RELATED APPLICATIONS

This application is a National Stage of International Application No. PCT/JP2011/073670 filed Oct. 14, 2011, claiming priority based on Japanese Patent Application No. 2010-232565, filed Oct. 15, 2010, the contents of all of which are incorporated herein by reference in their entirety.

FIELD

The present invention relates to a laser machining device and a bellows device.

BACKGROUND

A laser machining device that machines a workpiece by irradiating the workpiece with a laser beam guides a laser beam emitted from a laser oscillator onto the workpiece along a predetermined optical path. When it is necessary to make an optical length variable for a reason of focusing or the like, then the laser machining device is provided with a bellows device including a extensible and contractible cylindrical bellows, and the bellows device is configured to have a bellows surrounding the optical path and to allow the laser beam to advance within the bellows.

When the optical path is misaligned, the bellows meanders, or a laser beam is reflected by a workpiece or the like and applied on a bellows surface for some reasons, the bellows may be carbonized (burned), damaged, and bored. Furthermore, also in a case where melts (sputters) generated during laser machining are scattered and attached to the bellows, the bellows may be carbonized and damaged.

Therefore, as disclosed in Patent Literature 1, an attempt has been made to weave lead wires into a bellows and to detect damage to the bellows based on the change in conductive state of the lead wires.

Furthermore, as disclosed in Patent Literature 2, when smoke detecting means having a light emitting diode and an optical sensor provided in a bellows, smoke generated when the bellows is carbonized can be detected, and thereby it is possible to detect damage to the bellows.

CITATION LIST

Patent Literatures

Patent Literature 1: Japanese Patent Application Laid-open No. H9-220691
Patent Literature 2: Japanese Patent Application Laid-open No. S64-5690

SUMMARY

Technical Problem

However, the invention disclosed in Patent Literature 1 mentioned above requires the lead wires to be woven into the bellows and so manufacturing cost of the bellows adversely increases. Furthermore, irradiation of a laser beam onto the bellows can not be detected until the bellows is damaged to the extent that the lead wires are disconnected. Further, damage to the bellows can not be detected when the laser beam is applied onto a portion where any lead wires are not present.

Furthermore, when the smoke detecting means in the invention disclosed in the Patent Literature 2 is provided within the bellows, damage to the bellows can not be detected if there is no smoke near the smoke detecting means. As a result, when the bellows is carbonized in a position that is significantly away from the smoke detecting means, damage to the bellows can not be detected or it takes a long time to detect the damage.

The present invention has been achieved in view of the above-mentioned circumstances, and an object of the invention is to provide a laser machining device and a bellows device, which can quickly detect damage to a bellows irrespective of a position where the damage is caused.

Solution to Problem

In order to solve the above-mentioned problems and achieve the object, the present invention provides a laser machining device comprising: a machining table on which a workpiece is placed; a laser oscillator that emits a laser beam; a light-guide optical system that deflects the laser beam emitted from the laser oscillator; an extensible/contractible bellows that has a shape of a cylinder and surrounds an optical path of the laser beam after the light-guide optical system deflects the laser beam; a bend mirror that is capable of moving in an axial direction of the bellows while extending or contracting the bellows being coupled therewith, and deflects the laser beam having passed through the bellows in a direction toward the machining table; a machining head that irradiates the workpiece with the laser beam deflected by the bend mirror; an abnormality detector including a light emitting unit that emits a light beam advancing in parallel with an axis of the bellows, and a light receiving unit that measures the amount of received light of the light beam; and a control unit that brings down the laser oscillator when the amount of received light of the light beam in the light receiving unit falls below a first threshold.

Advantageous Effects of Invention

According to the present invention, damage to a bellows can be quickly detected irrespective of a position where the damage is caused in the bellows.

DESCRIPTION OF EMBODIMENTS

Now embodiments of a laser machining device and a bellows device will be described below in detail with reference to the drawings. It is noted that the invention is not limited to the embodiments.

First Embodiment

Figure 1:
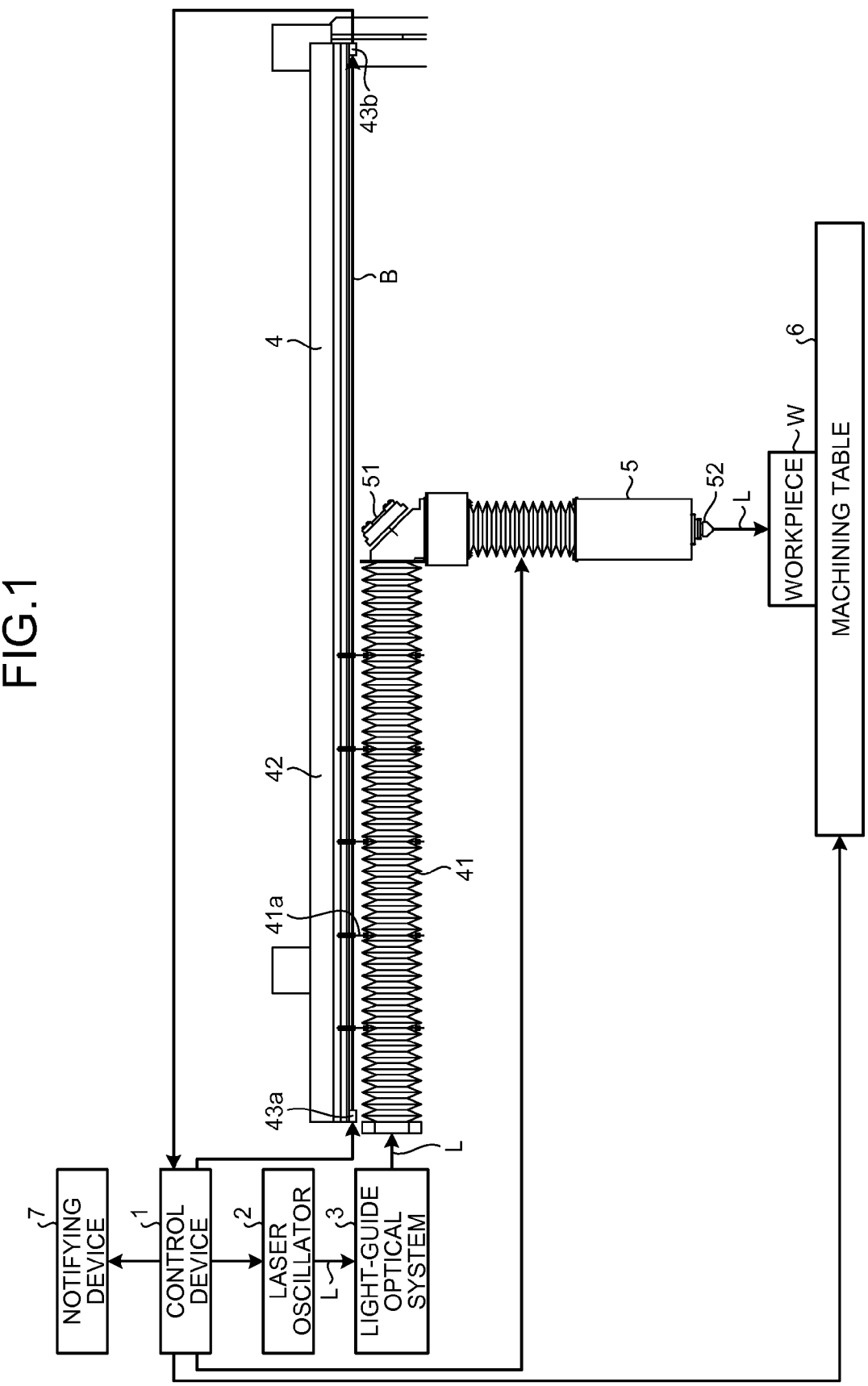
FIG. 1 is a diagram showing a configuration of a laser machining device according to a first embodiment of the present invention.

FIG. 1 is a diagram showing a configuration of a laser machining device according to a first embodiment of the present invention. The laser machining device is configured to include a control device 1, a laser oscillator 2, a light-guide optical system 3, a bellows device 4, a machining head 5, a machining table 6, and a notifying device 7. The laser machining device propagates a laser beam L emitted from the laser oscillator 2 along a predetermined optical path and guides the laser beam L to a workpiece W on the machining table 6.

The laser oscillator 2 is a device that oscillates the laser beam L such as a $CO_2$ laser, and emits the laser beam L while variously changing a laser output at the time of laser machining.

The light-guide optical system 3 includes optical components (not shown), such as a PR mirror that partially reflects the laser beam L emitted from the laser oscillator 2, a bend mirror that changes a beam angle of the laser beam L coming from the PR mirror, a beam optimizing unit that adjusts a beam diameter (diameter) of the laser beam L coming from the bend mirror, and a bend mirror that deflects in beam angle the laser beam L coming from the beam optimizing unit in a horizontal direction.

The bellows device 4 includes a cylindrical bellows 41 provided between the light-guide optical system 3 and the machining head 5 to surround an optical path along an optical axis of the laser beam L, a bellows moving guide (bellows guide) 42 that guides a movement of the bellows 41, and a beam sensor (a beam-sensor light-emitting unit 43a and a beam-sensor light-receiving unit 43b) serving as an abnormality detector.

Figure 2:
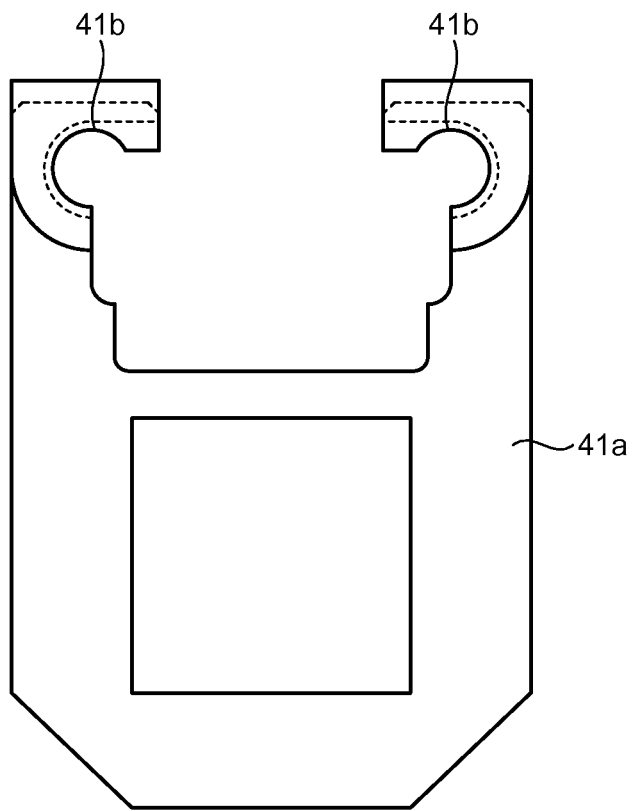
FIG. 2 is an illustration showing a shape of a frame.
Figure 3:
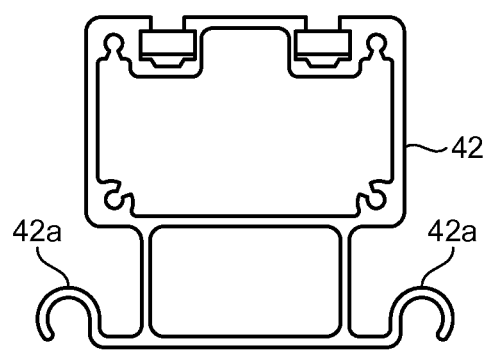
FIG. 3 is an illustration showing a cross-sectional shape of a bellows moving guide.

The bellows 41 protects the optical path from outside air (such as machining dust) by blocking an optical path environment from outside air. The bellows 41 is configured to be extensible and contractible in the same direction as that of the optical path (optical axis) of the laser beam L. An end portion of the bellows 41 at the side of the light-guide optical system 3 is fixed to a bend mirror included in the light-guide optical system 3, and the bellows 41 extends or contracts with another end portion thereof at the side of the machining head 5 being moved following the machining head 5. Substantially flat-plate frames 41a are attached to the bellows 41 at a predetermined interval, and the bellows 41 is suspended from the bellows moving guide 42 via the frames 41a. FIG. 2 is an illustration showing a shape of the frame 41a. FIG. 3 is an illustration showing a cross-sectional shape of the bellows moving guide 42. The frame 41a is formed with sliding portions 41b shaped to correspond to guide portions 42a of the bellows moving guide 42. When the bellows 41 extends or contracts, the entirety of the frame 41a is moved by allowing the sliding portions 41b to slide along the guide portions 42a.

Figure 4:
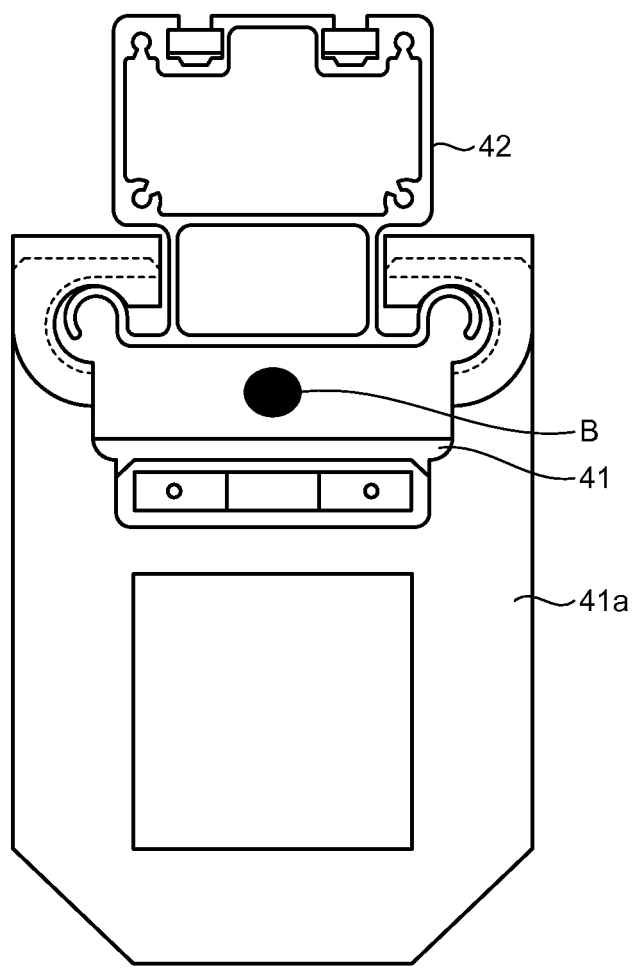
FIG. 4 is an illustration showing a state where a light beam passes through a space between the bellows moving guide and a bellows.

The bellows moving guide 42 is provided to stride over the machining table 6, and includes the beam-sensor light-emitting unit 43a provided on one end thereof and the beam-sensor light-receiving unit 43b provided on the other end thereof. With this configuration, a light beam B emitted from the beam-sensor light-emitting unit 43a advances in a space between the bellows moving guide 42 and the bellows 41 in parallel with the bellows 41, and reaches the beam-sensor light-receiving unit 43b. FIG. 4 is an illustration showing a state where the light beam B passes through a space between the bellows moving guide 42 and the bellows 41. The amount of received light in the beam-sensor light-receiving unit 43b is outputted to the control device 1. While the bellows device 4 is configured such that the beam-sensor light-emitting unit 43a is disposed on a side of a fixed end (an end at the side of the light-guide optical system 3) of the bellows 41 as an example, positions where of the beam-sensor light-emitting unit 43a and the beam-sensor light-receiving unit 43b are disposed are replaceable with each other.

The machining head 5 is coupled to a bend mirror 51 that deflects in beam angle the laser beam L having passed through the bellows device 4 in a direction toward the machining table 6 (downward in a vertical direction, for example), and the laser beam L deflected by the bend mirror 51 is incident on the machining head 5. The machining head 5 includes a machining lens 52 that concentrates the laser beam L from the bend mirror 51 on a small spot diameter and that applies the concentrated laser beam L onto the workpiece W. Inside the machining head 5, purge gas ($N_2$, for example) having no influence on an absorption ratio of the passing laser beam L is released. The purge gas released inside the machining head 5 flows into the bellows 41. The purge gas within the bellows 41 is discharged from the side of the light-guide optical system 3 of the bellows 41. Accordingly, an air current flowing from the side of the machining head 5 to the side of the light-guide optical system 3 is formed in the bellows 41. The machining head 5 is movable in an axial direction of the bellows 41 while extending or contracting the bellows 41 coupled to the machining head 5.

The workpiece W is put on the machining table 6 and subjected to laser machining on the machining table 6.

The notifying device 7 is a device that aurally and visually notifies a user of occurrence of an abnormality, and an alarm, an alarm lamp, a display, a loudspeaker and/or the like is applicable for the notifying device 7.

The control device 1 controls driving and stopping of the laser oscillator 2, movement of the machining head 5, feeding of the machining table 6, and the like. The control device 1 also controls a notifying operation using the notifying device 7. Furthermore, the control device 1 determines whether there is any damage to the bellows 41 based on a detection result of the beam sensor (the amount of received light in the beam-sensor light-receiving unit 43b).

When the bellows 41 is damaged in a situation where the laser beam L is applied onto a bellows surface or in the like situations, particulate-containing smoke is generated as a result of carbonization of the bellows 41. When the smoke is sent upwards and reaches a space sandwiched between the beam-sensor light-emitting unit 43a and the beam-sensor light-receiving unit 43b, the amount of received light in the beam-sensor light-receiving unit 43b falls below a predetermined first threshold. The control device 1 detects that the bellows 41 has been damaged based on the fact that the amount of received light in the beam-sensor light-receiving unit 43b falls below the first threshold.

Figure 5A:
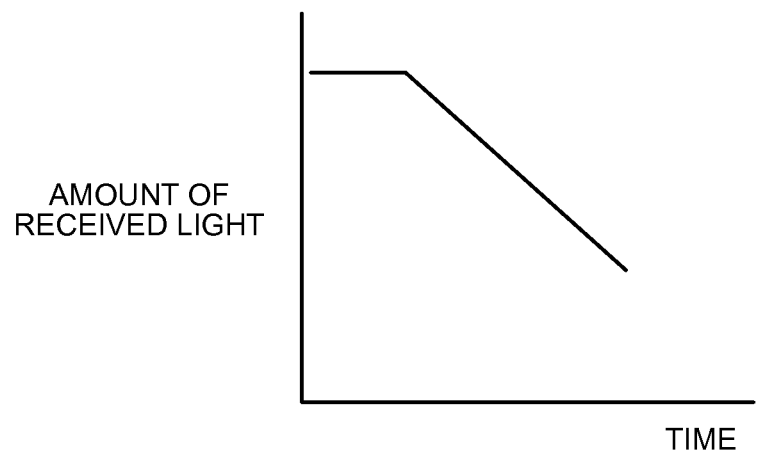
FIG. 5A is a graph showing change in the amount of received light when smoke is generated as a result of carbonization of a bellows.
Figure 5B:
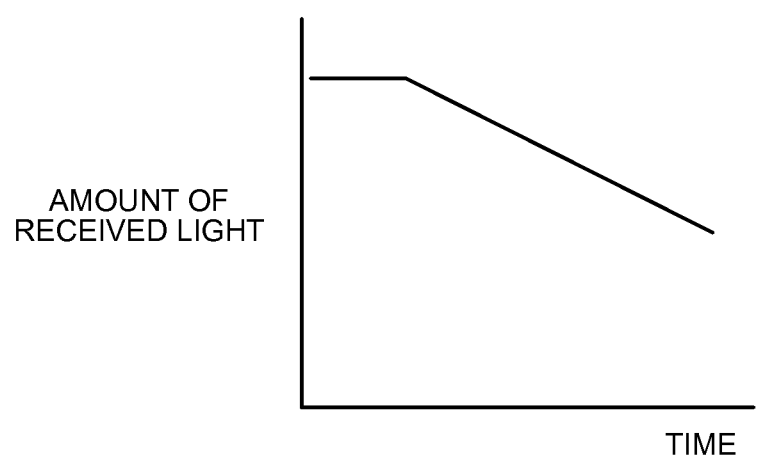
FIG. 5B is a graph showing change in the amount of received light due to an influence of dust generated by laser machining.

FIG. 5 are graphs showing change in the amount of light received by the beam-sensor light-receiving unit 43b during laser machining. FIG. 5A is a graph showing change in the amount of received light when smoke is generated as a result of carbonization of the bellows 41. FIG. 5B is a graph showing change in the amount of received light due to an influence of dust generated by laser machining. Because dust is generated during laser machining, the amount of received light in the beam-sensor light-receiving unit 43b gradually falls during the laser machining even when the smoke resulting from carbonization of the bellows 41 is not generated. However, the degree of the fall in the amount of received light is small because the dust generated in the laser machining is not so high in particulate density as compared with the smoke generated when the bellows 41 is carbonized. Therefore, the control device 1 may monitor the decrement in the amount of received light per unit time, and if the decrement in the amount of received light per unit time is smaller than a third threshold, then the control device 1 may not determine that the bellows 41 has been damaged even when the amount of light received by the beam-sensor light-receiving unit 43b becomes smaller than the first threshold.

The control device 1 stops the laser machining when detecting the damage to the bellows 41. That is, the control device 1 stops the laser oscillator 2. In addition, the control device 1 can also stop the movement of the machining head 5 and the feeding of the machining table 6. The control device 1 then drives the notifying device 7 to notify a user that the laser machining has been stopped. For example, it is sufficient that the notifying is made by issuing an alarm sound, turning on (or blinking on and off) a lamp, displaying an error message, or issuing a voice message.

Figure 6:
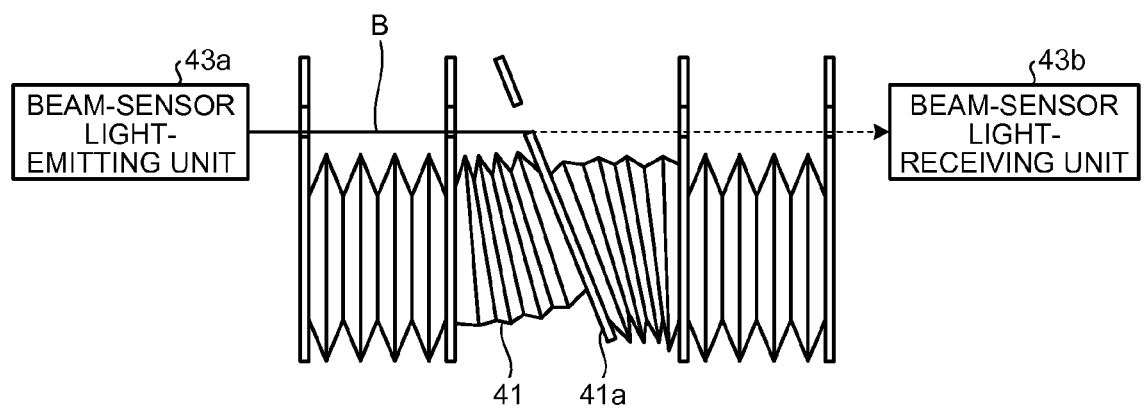
FIG. 6 is an illustration showing one example of a state where an inclined frame blocks a light beam.

When the beam-sensor light-emitting unit 43a and the beam-sensor light-receiving unit 43b are arranged such that an inclined or upwardly floating frame 41a can block the light beam B in a case where a sliding fault occurs between the frames 41a and the bellows moving guide 42, the amount of light received by the beam-sensor light-receiving unit 43b becomes smaller than a second threshold that is smaller than the first threshold at the time of occurrence of the sliding fault (or becomes zero when the light beam is blocked completely). FIG. 6 is an illustration showing one example of a state where the inclined frame 41a blocks the light beam B. When the bellows 41 is damaged for the reason of carbonization of the bellows 41, the amount of light received by the beam-sensor light-receiving unit 43b falls but does not become below the second threshold. Therefore, the control device 1 can discriminate the damage to the bellows 41 from the sliding fault of the frames 41a based on whether the amount of received light is smaller than the second threshold as long as the beam-sensor light-emitting unit 43a and the beam-sensor light-receiving unit 43b are arranged such that the light beam B is blocked by the frame 41a when the sliding fault occurs.

When detecting the sliding fault of the frames 41a, the control device 1 continues laser machining after reducing an extension/contraction speed of the bellows 41 (that is, a moving speed of the machining head 5). Also in this case, the control device 1 can start the notifying device 7 to notify a user of occurrence of the sliding fault. Alternatively, it is also possible that the control device 1 stops laser machining when detecting the sliding fault of the frames 41a.

In the present embodiment, the beam sensor can detect smoke over the entire length of the bellows moving guide 42, and therefore it is possible to quickly detect it even if any portion of the bellows 41 in a longitudinal direction has been damaged due to the carbonization. Also in a circumferential direction of the bellows 41, it is possible to detect the damage caused by the carbonization without any limitation to specific positions. In addition to this, the manufacturing cost of the bellows 41 does not increase because there is no need to weave conductors such as lead wires into the bellows 41.

Second Embodiment

Figure 7:
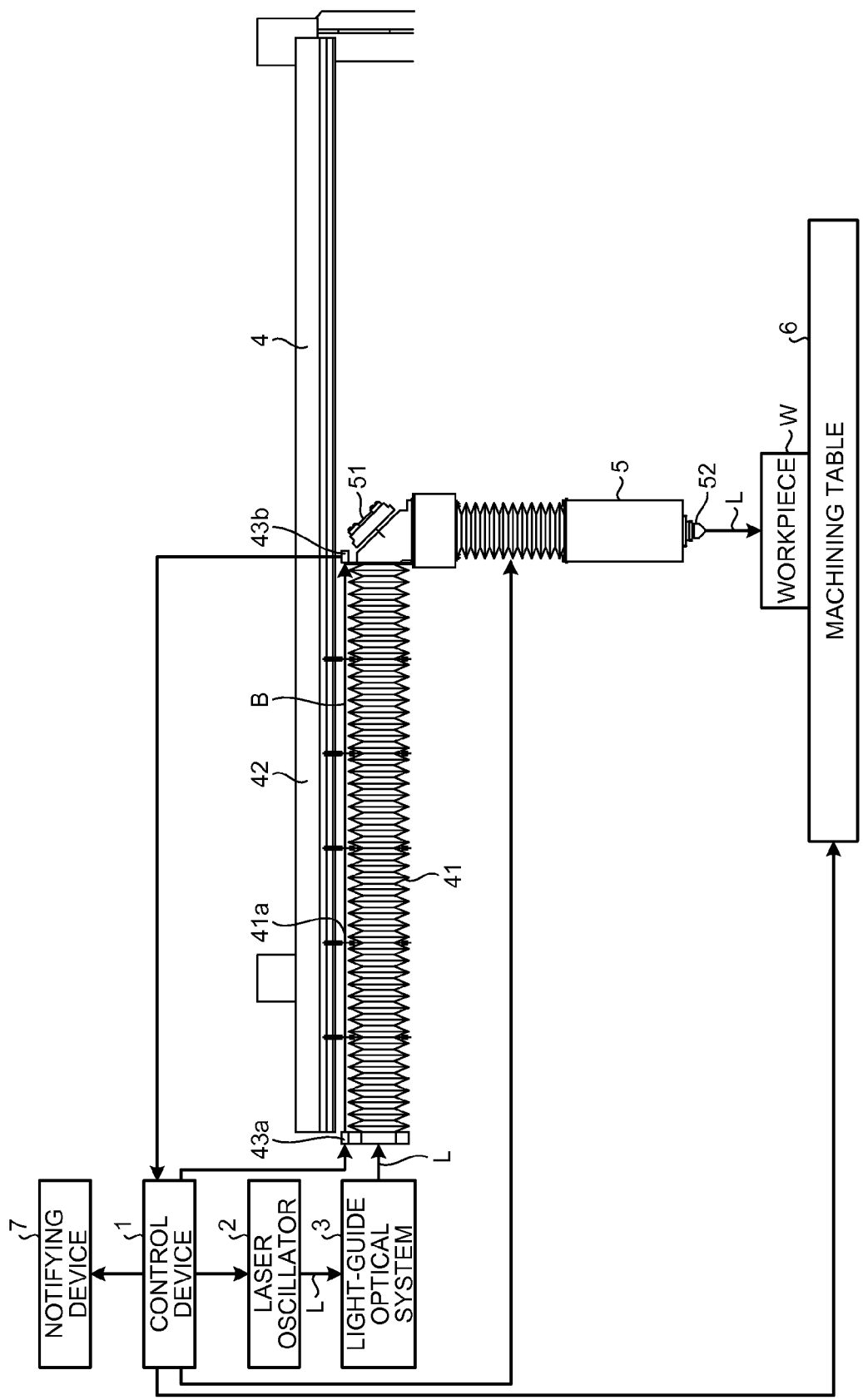
FIG. 7 is a diagram showing a configuration of a laser machining device according to a second embodiment of the present invention.

FIG. 7 is a diagram showing a configuration of a laser machining device according to a second embodiment of the present invention. The present embodiment is different from the first embodiment in that a beam sensor is provided not on the bellows moving guide 42 but on the bellows 41.

In the present embodiment, the amount of light received by the beam-sensor light-receiving unit 43b changes according to the extension/contraction of the bellows 41, that is, a position of the machining head 5. For this reason, the control device 1 determines whether there is any damage to the bellows 41 for the reason of the carbonization after correcting the amount of light received by the beam-sensor light-receiving unit 43b according to the position of the machining head 5.

Because other features of the second embodiment are equivalent to those of the first embodiment, redundant description thereof is omitted.

In the present embodiment, it is possible to detect smoke over the entire length of the bellows moving guide 42, and therefore it is possible to quickly detect which portion of the bellows 41 in a longitudinal direction has been damaged as a result of carbonization. Also in any portions in a circumferential direction, it is possible to detect the damage due to the carbonization without any limitation to specific positions. Besides, the manufacturing cost of the bellows 41 does not increase because there is no need to weave conductors such as lead wires into the bellows 41.

Third Embodiment

Figure 8:
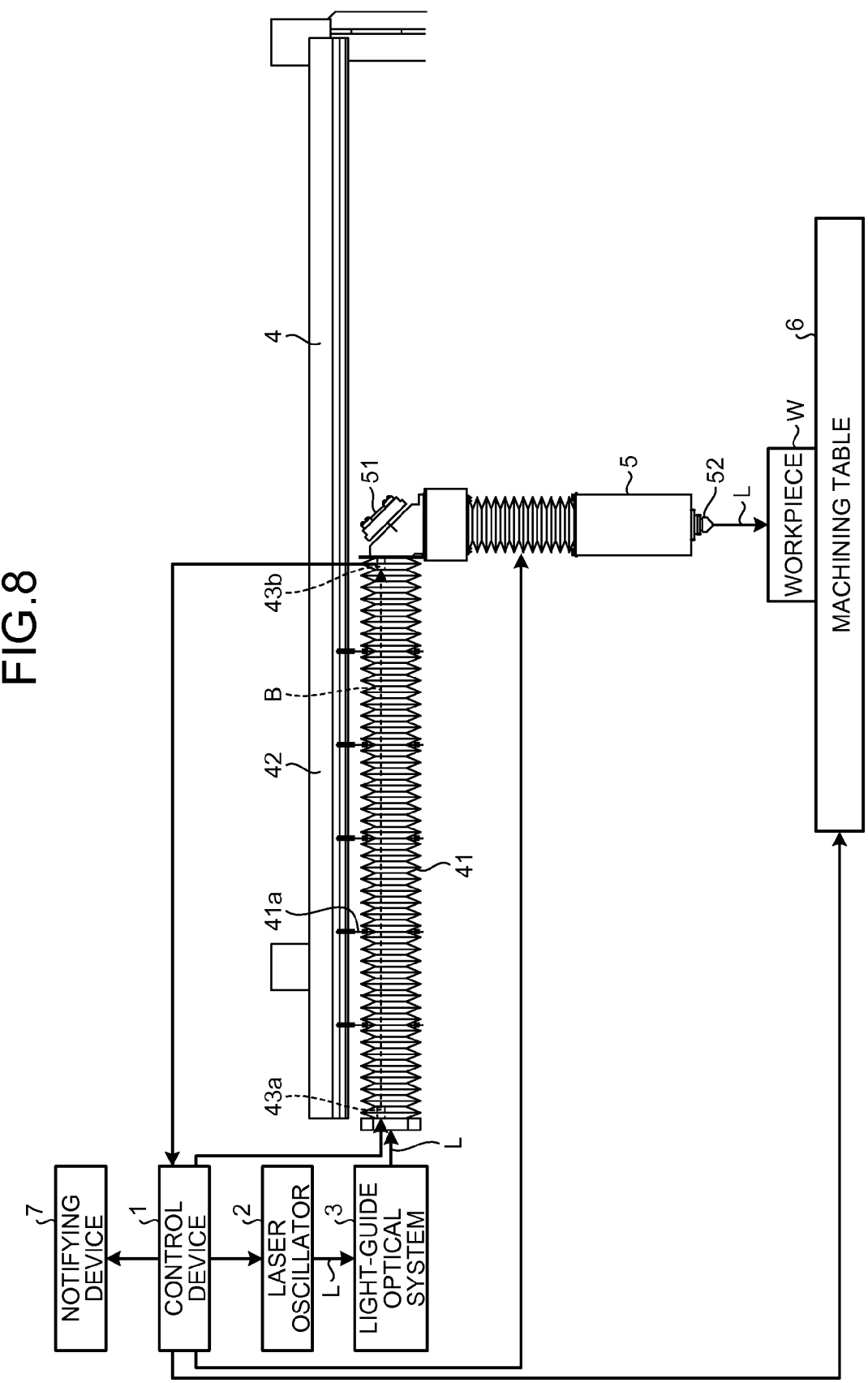
FIG. 8 is a diagram showing a configuration of a laser machining device according to a third embodiment of the present invention.

FIG. 8 is a diagram showing a configuration of a laser machining device according to a third embodiment of the present invention. The present embodiment is different from the second embodiment in that a beam sensor is provided inside the bellows 41. That is, in the present embodiment, the light beam B emitted from the beam-sensor light-emitting unit 43a passes through an internal space of the bellows 41 and reaches the beam-sensor light-receiving unit 43b.

When light reflected from the workpiece W or the like is incident on the machining head 5 and applied to an inside surface of the bellows 41, the bellows 41 is carbonized from its inside. Accordingly, no smoke leaks out of the bellows 41 until the bellows 41 has an opening. Therefore, in the case where the beam sensor is disposed outside the bellows 41 as in the first and second embodiments, damage to the bellows 41 can not be detected before the bellows 41 has an opening even if the inside of the bellows 41 is damaged by the carbonization. On the other hand, in the present embodiment, occurrence of the damage inside the bellows 41 due to the carbonization can be quickly detected because the light beam B passes through the inside of the bellows 41.

Furthermore, in the present embodiment, the light beam B is not scattered by the influence of dust because the light beam B passes through the inside of the bellows 41. Therefore, the amount of light received by the beam-sensor light-receiving unit 43b is not reduced by the influence of the dust during laser machining.

However, note that any sliding fault of the frames 41a can not be detected in the present embodiment because the light beam B passes through the inside of the bellows 41.

As described above, according to the present embodiment, the damage to the inside of the bellows 41 that cannot be visually recognized can be detected before the bellows 41 has an opening.

Because other features of the third embodiment are equivalent to those of the second embodiment, redundant description thereof is omitted.

Fourth Embodiment

In the first to third embodiments, the bellows device 4 is configured to arrange the beam-sensor light-emitting unit 43*a* and the beam-sensor light-receiving unit 43*b* so that the light beam B advances in parallel to the bellows 41 over the entire length of the bellows 41 as an example. Alternatively, the beam-sensor light-emitting unit 43*a* and the beam-sensor light-receiving unit 43*b* can be arranged such that the light beam B can advance in parallel to a part of the bellows 41. For example, the light beam B may advance in parallel to only a half of the bellows on the side of the machining head 5 (or a half of the bellows on the side of the light-guide optical system 3), or the light beam B may advance in parallel to only an intermediate part of the bellows 41.

Fourth Embodiment

Figure 9:
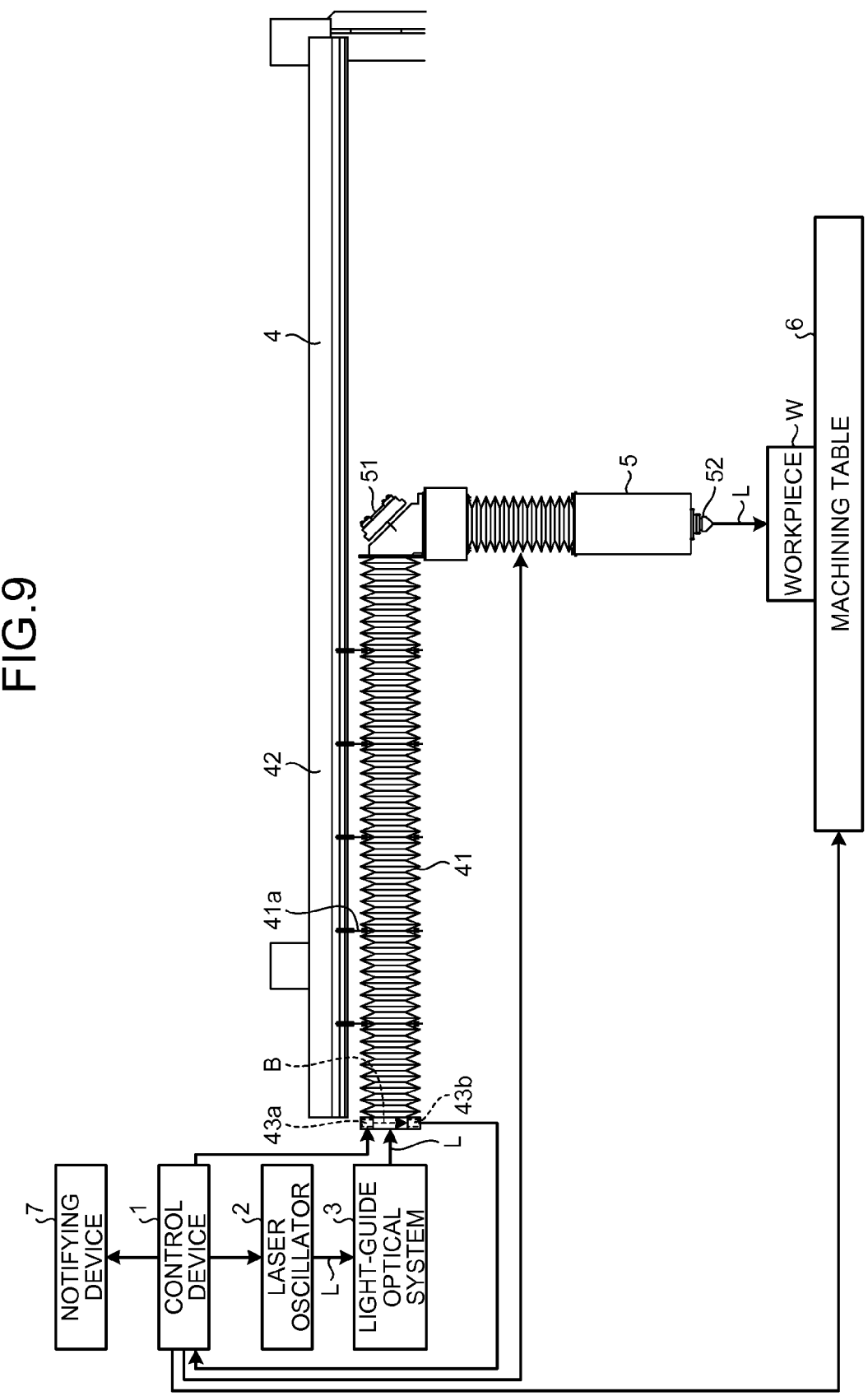
FIG. 9 is a diagram showing a configuration of a laser machining device according to a fourth embodiment of the present invention.

FIG. 9 is a diagram showing a configuration of a laser machining device according to a fourth embodiment of the present invention. The present embodiment is different from the third embodiment in that the beam-sensor light-emitting unit 43*a* and the beam-sensor light-receiving unit 43*b* are provided inside an end of the bellows 41 at the side of the light-guide optical system 3, that is a downstream side of the flow of purge gas. The light beam B emitted from the beam-sensor light-emitting unit 43*a* crosses the laser beam L inside the bellows 41 in a direction perpendicular to the laser beam L and reaches the beam-sensor light-receiving unit 43*b*.

As described above, the purge gas flows within the bellows 41 from the side of the machining head 5 to the side of the light-guide optical system 3. Therefore, smoke generated in any portion of the inside of the bellows 41 in the longitudinal direction moves along the flow of the purge gas and reaches the end portion on the side of the light-guide optical system 3. Furthermore, the smoke generated inside the bellows 41 climbs within the bellows 41, and so becomes passing through a portion closer to an upper portion of the bellows 41 as the smoke moves farther away from a damaged portion. In the present embodiment, the beam-sensor light-emitting unit 43*a* and the beam-sensor light-receiving unit 43*b* are arranged near the end portion of the bellows 41 on the downstream side of the flow of the purge gas so that the light beam B traverses the inside of the bellows 41 in the direction perpendicular to the laser beam L. Therefore, it is possible to detect damage to the bellows 41 irrespective of where carbonization of the bellows 41 occurs.

In the present embodiment, although a configuration in which purge gas flows from the side of the machining head 5 to the side of the light-guide optical system 3 has been discussed as an example, it is also possible that the purge gas is supplied from a fixed end side (the side of the light-guide optical system 3) of the bellows 41 and set to flow toward a moving end (the side of the machining head 5) of the bellows 41. In this case, it is needless to mention that it is sufficient to provide the beam-sensor light-emitting unit 43*a* and the beam-sensor light-receiving unit 43*b* on the side of the machining head 5 of the bellows 41 that is the downstream side of the flow of the purge gas.

In the present embodiment, it is easy to perform an assembly operation such as sensor positioning because the distance between the beam-sensor light-emitting unit 43*a* and the beam-sensor light-receiving unit 43*b* can be reduced.

Because other features of the fourth embodiment are equivalent to those of the third embodiment, redundant description thereof is omitted.

INDUSTRIAL APPLICABILITY

As described above, the laser machining device and the bellows device according to the present invention are useful since damage to a bellows can be detected irrespective of a position of the damage, and are particularly suitable to limit increase of manufacturing costs of the devices.

REFERENCE SIGNS LIST

1 CONTROL DEVICE
2 LASER OSCILLATOR
3 LIGHT-GUIDE OPTICAL SYSTEM
4 BELLOWS DEVICE
5 MACHINING HEAD
6 MACHINING TABLE
7 NOTIFYING DEVICE
41 BELLOWS
41*a* FRAME
42 BELLOWS MOVING GUIDE
43*a* BEAM-SENSOR LIGHT-EMITTING UNIT
43*b* BEAM-SENSOR LIGHT-RECEIVING UNIT
51 BEND MIRROR
52 MACHINING LENS

The invention claimed is:

1. A laser machining device comprising:
a machining table on which a workpiece is placed;
a laser oscillator that emits a laser beam;
a light-guide optical system that deflects the laser beam emitted from the laser oscillator;
an extensible and contractible bellows that has a shape of a cylinder and surrounds an optical path of the laser beam after the light-guide optical system deflects the laser beam;
a bend mirror that deflects the laser beam having passed through the bellows in a direction toward the machining table, the bend mirror being coupled to the bellows;
a machining head that irradiates the workpiece with the laser beam deflected by the bend mirror;
an abnormality detector including a light emitting unit that emits a light beam which is separate from the laser beam and which advances in parallel with an axis of the bellows, and a light receiving unit that measures an amount of received light of the light beam; and
a control unit that selectively controls the laser oscillator to stop emitting the laser beam when the amount of received light of the light beam in the light receiving unit falls below a first threshold.

2. The laser machining device according to claim 1, wherein the light emitting unit and the light receiving unit are arranged such that the light beam is in parallel with an axis of the bellows over an entire length of the bellows.

3. The laser machining device according to claim 2, further comprising a bellows guide that is longer than the bellows and guides the bellows with the bellows being suspended on the guide, wherein
the light emitting unit is disposed on a lower portion of the bellows guide near one end thereof, and the light receiving unit is disposed in a lower portion of the bellows guide near the other end thereof.

4. The laser machining device according to claim 2, wherein the light emitting unit is disposed on an upper portion of the bellows near one end thereof outside the bellows, and the light receiving unit is disposed on an upper portion of the bellows near the other end thereof outside the bellows.

5. The laser machining device according to claim 3, wherein the control unit reduces a moving speed of the machining head when the amount of received light of the light beam in the light-receiving unit becomes smaller than a second threshold that is smaller than the first threshold.

6. The laser machining device according to claim 3, wherein the control unit does not control the laser oscillator to stop emitting the laser beam even if the amount of received light of the light beam in the light-receiving unit falls below the first threshold, when decrement per unit time in the amount of received light of the light beam in the light-receiving unit is smaller than a third threshold.

7. The laser machining device according to claim 2, wherein the light emitting unit is disposed on an upper portion of the bellows near one end thereof inside the bellows, and the light receiving unit is disposed in an upper portion of the bellows near the other end thereof inside the bellows.

8. A laser machining device comprising:
a machining table on which a workpiece is placed;
a laser oscillator that emits a laser beam;
a light-guide optical system that deflects the laser beam emitted from the laser oscillator;
an extensible and contractible bellows that has a shape of a cylinder and surrounds an optical path of the laser beam after the light-guide optical system deflects the laser beam;
a bend mirror that deflects the laser beam having passed through the bellows in a direction toward the machining table, the bend mirror being coupled to the bellows;
a machining head that irradiates the workpiece with the laser beam deflected by the bend mirror;
a unit that supplies purge gas to form an air current within the bellows, the air current having a downstream side on a side of the light-guide optical system;
an abnormality detector including a light emitting unit that emits a light beam which is separate from the laser beam in a direction perpendicular to the laser beam near an end portion of the bellows at a side of the light-guide optical system, and a light receiving unit that measures an amount of received light of the light beam; and
a control unit that selectively controls the laser oscillator to stop emitting the laser beam when the amount of received light of the light beam in the light receiving unit falls below a first threshold.

9. The laser machining device according to claim 4, wherein the control unit reduces a moving speed of the machining head when the amount of received light of the light beam in the light-receiving unit becomes smaller than a second threshold that is smaller than the first threshold.

10. The laser machining device according to claim 4, wherein the control unit does not control the laser oscillator to stop emitting the laser beam even if the amount of received light of the light beam in the light-receiving unit falls below the first threshold, when decrement per unit time in the amount of received light of the light beam in the light-receiving unit is smaller than a third threshold.

* * * * *